United States Patent [19]

Shirakawa

[11] Patent Number: 4,885,765

[45] Date of Patent: Dec. 5, 1989

[54] TELEPHONE SYSTEM WITH STIMULUS OPERATION OR DEFAULT OPERATION

[75] Inventor: Masakazu Shirakawa, Kawasaki, Japan

[73] Assignee: Kabushiki Kaisha Toshiba, Kawasaki, Japan

[21] Appl. No.: 108,223

[22] Filed: Oct. 14, 1987

[30] Foreign Application Priority Data

Oct. 15, 1986 [JP] Japan .................. 61-244575

[51] Int. Cl.$^4$ ........................................... H04M 11/00
[52] U.S. Cl. ........................................ 379/93; 379/96
[58] Field of Search ................................... 379/93, 96

[56] References Cited

U.S. PATENT DOCUMENTS

| | | | |
|---|---|---|---|
| 4,585,908 | 4/1986 | Smith | 379/96 |
| 4,650,927 | 3/1987 | James | 379/96 |
| 4,653,086 | 3/1987 | Laube | 379/96 |
| 4,794,639 | 12/1988 | Urui et al. | 379/96 |

FOREIGN PATENT DOCUMENTS

| | | |
|---|---|---|
| 0120476 | 3/1984 | European Pat. Off. . |
| 2154393 | 9/1985 | United Kingdom . |
| 2156186 | 10/1985 | United Kingdom . |
| 2163320 | 2/1986 | United Kingdom . |
| 2183423 | 6/1987 | United Kingdom . |
| 8401870 | 5/1984 | World Int. Prop. O. . |
| 8402440 | 6/1984 | World Int. Prop. O. . |
| 8403405 | 8/1984 | World Int. Prop. O. . |

OTHER PUBLICATIONS

ISDN User–Network Interface Layer 3 Specification (CCITT Rec. I.451), Section 4.5.14.

Primary Examiner—Gerald Brigance
Assistant Examiner—Richard Hjerpe
Attorney, Agent, or Firm—Oblon, Spivak, McClelland, Maier & Neustadt

[57] ABSTRACT

A main apparatus transmits auxiliary information, which is concerned with telephone communications and includes at least an information attribute and an information entity. A telephone terminal apparatus is coupled to the main apparatus by a local telephone line, and has components for controlling the auxiliary information supplied from the main apparatus on the basis of the operation auxiliary information. The components are able to register a predetermined mode corresponding to the auxiliary information in the telephone terminal apparatus.

9 Claims, 4 Drawing Sheets

TELEPHONE SYSTEM WITH STIMULUS OPERATION OR DEFAULT OPERATION

BACKGROUND OF THE INVENTION

This invention generally relates to a telephone system and, more particularly, to a telephone system in which a plurality of telephone terminal apparatuses are coupled, via local telephone lines, to a main apparatus with a stimulus operation or a default operation. This invention also relates to a telephone terminal apparatus which is adapted for use in the above telephone system and is equipped, for example, with a display device for presenting various auxiliary information about operation to a user.

Recently, telephone terminal apparatuses provided with various telephone service functions have recently been developed for use as key telephones or the like, in the above telephone system with a stimulus operation. Telephone terminal apparatuses for use in this type of telephone system are typically capable of displaying various types of message information, supplied from a main apparatus, on a display device. In general, the main apparatus controls where on the display the message information should be displayed.

That is, the main apparatus supplies message information and display position control information to a telephone terminal apparatus, which in turn simply displays the message information on the display device, in accordance with the received display position control information. Every time a new telephone terminal apparatus is coupled to the main apparatus, it is necessary to introduce additional control software into, or else modify the existing software in the main apparatus, so that the new terminal apparatus can operate. An undesirable increase in the amount of software is inevitable, and the telephone system and its operation are complex.

There is now demand from users that a feature be added to telephone terminal apparatuses to permit users to modify, as desired, the conventional layout of message information displayed on the display device of the terminal apparatus. Fulfilling this and other customer demands inevitably increases software for the main apparatus, and consequently increases the work load thereof.

The above description discusses the problem concerned with only the display control (character display) of message information. If the control of other operation auxiliary information, such as tone output and lamp display, were also included, therefore, the aforementioned problem would become even more prominent.

As should be clear from the above description, according to conventional telephone systems with a stimulus operation, the main apparatus coupled to telephone terminal apparatuses is responsible for executing operational control, including display control for displaying various types of message information on the display devices associated with the telephone terminal apparatuses. This type of control may require more software for the main apparatus, and the main apparatus must perform more control.

The telephone system to which this invention relates differs from a system which provides a standardized interface between a main apparatus and a telephone terminal apparatus coupled via a general telephone line by an ISDN (Integrated Services Digital Network). In other words, this invention relates to a telephone system in which telephone terminal apparatuses are connected to a main apparatus by a local line, not by a general-propose line, and which can perform a stimulus operation or a default operation.

SUMMARY OF THE INVENTION

It is therefore an object of the present invention to provide a new and improved telephone system with a stimulus operation or a default operation which provides a telephone terminal apparatus with greater freedom to control operational information without increasing software for a main apparatus and the work load thereof.

Another object of this invention is to provide a telephone terminal apparatus which can easily meet various user demands concerning operational information that includes control of the display layout, for example, of message information without increasing software for a main apparatus and the work load thereof.

According to one aspect of the present invention, there is provided a telephone system with a stimulus operation or a default operation, the system comprising:

a main apparatus for transmitting auxiliary information, which is concerned with telephone communications and includes at least, an information attribute and an information entity; and a telephone terminal apparatus, coupled to the main apparatus via a local telephone line, having means for controlling the auxiliary information supplied from the main apparatus, the controlling means being able to register a predetermined mode corresponding to the auxiliary information in the telephone terminal apparatus.

The telephone terminal apparatus of the system can perform a functional mode even during a stimulus operation, and can perform a default operation in response to the command from the main apparatus without adding the functional mode.

For example, this invention overcomes the aforementioned problem by:

(1) permitting the positions on a display device where message information is displayed to be settable for each telephone terminal apparatus based on information entered via a key input section, (2) giving attribute information to the message information entered over a communication path, and (3) attaining the position set on the display device for displaying the message information in accordance with the attribute information when the message information together with the attribute information are input over the communication path, and displaying the message information on that position.

According to this invention, for example, where to display message information or the message layout can be set for each telephone terminal apparatus so that many user demands can effectively be met. Further, when the main apparatus at the time of outputting message information outputs its attribute information, the telephone terminal apparatus displays the message information in the set layout in accordance with the attribute information. This eliminates the need for the main apparatus to individually control telephone terminal apparatuses. As a result, the amount of the necessary software in the main apparatus need not be increased and the work load of the main apparatus can significantly be reduced.

BRIEF DESCRIPTION OF THE DRAWINGS

These and other objects and features of the present invention will be understood by those of ordinary skill in the art through the following detailed description of the preferred embodiments with reference to the accompanying drawings in which.

DETAILED DESCRIPTION OF THE PREFERRED EMBODIMENT

One embodiment of this invention will be explained below in conjunction with FIGS. 1 through 5.

Figure 1:
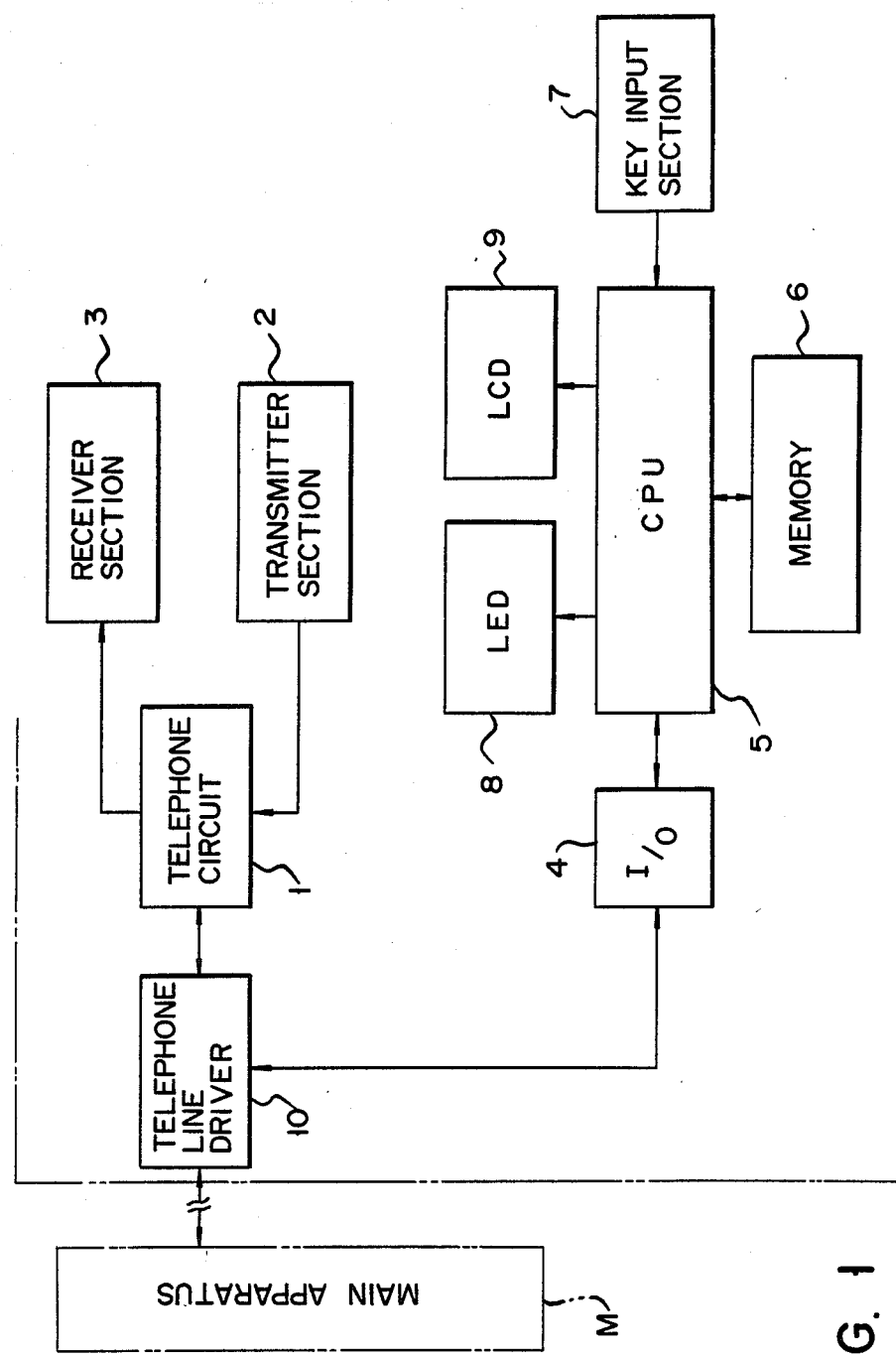
FIG. 1 is a schematic diagram illustrating the arrangement of a telephone terminal apparatus according to one embodiment of this invention.
Figure 2:
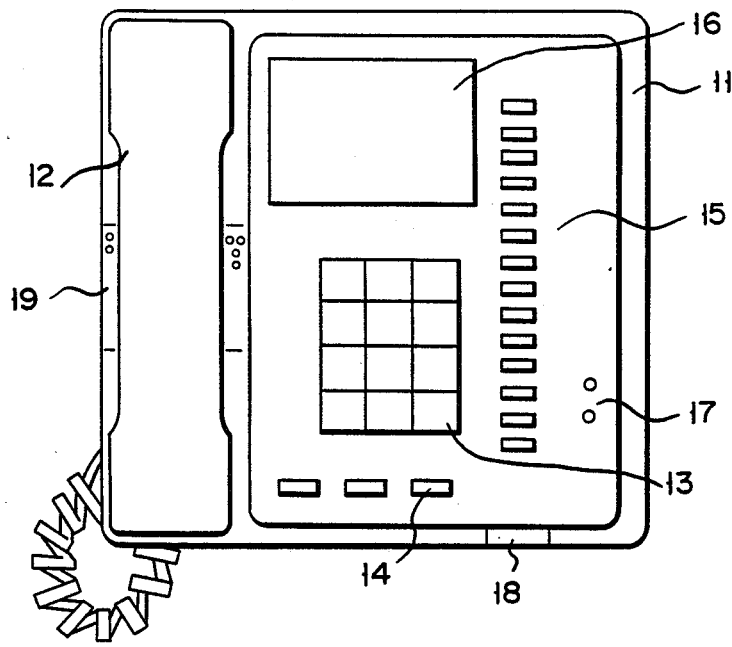
FIG. 2 is a diagram illustrating the layout of the telephone terminal apparatus shown in FIG. 1.

FIG. 1 is a schematic diagram of the arrangement of a telephone system according to one embodiment and particularly, the arrangement of a telephone terminal apparatus used in the system. FIG. 2 illustrates the external appearance of the telephone terminal apparatus.

As illustrated in FIG. 1, this telephone terminal apparatus basically comprises a transmitter section 2, a receiver section 3, both coupled to a telephone circuit 1, a central processing unit (CPU) 5 coupled to the telephone driver through an input/output (I/O) section 4, a memory 6 coupled to the CPU, a key input section 7, a light emitting display (LED) 8 constituting a lamp display unit and a liquid crystal display (LCD) 9 constituting a character display unit.

A voice communication is effected between this telephone terminal apparatus and a destination terminal apparatus using transmitter section 2 and receiver section 3. Telephone calling and receiving control and various telephone service functions are executed under the control of CPU 5 which has various control programs installed therein. Telephone line driver 10, which separates a voice signal to telephone circuit 1 from a digital signal to CPU 5, is coupled to an external main apparatus M through a telephone line.

As illustrated in FIG. 2, the telephone terminal apparatus is constituted by connecting a hand set 12 serving as transmitter section 2 and receiver section 3 to a terminal assembly 11 having the aforementioned circuitry built therein. In some cases the transmitter section 2 and receiver section 3 may well be replaced with a microphone 19 and a speaker 18 that are built in terminal assembly 11.

On the top of terminal assembly 1 are a dial pad 13, fixed function keys 14 and variable function keys 15 that constitute the aforementioned key input section 7. Character display unit 16 constituted by LCD 9 and lamp display unit 17 constituted by LED 8 are also provided on the top of terminal assembly 11. Dial pad 13 is for inputting dial information and various control information. Fixed function keys 14 are assigned with basic functions that are often used, such as "Hold," "Transfer," and "Terminate," and variable function keys 15 are assigned with functions whose contents and key depression sequences may be modified in accordance with the need of a user, such as "Redialing," "Auto Calling," and "One-touch Dialing." By selective operation of these function keys 14 and 15, control information is input to CPU 5 and a telephone calling and various telephone service functions start. Lamp display unit 17 indicates information about "Self Use," "Self Hold," and the like.

LCD 9 that constitutes character display unit 16 is designed to be able to display plural lines of characters each line containing a plurality of characters, and character display unit 16 (LCD 9) displays present time information and additional message information such as the telephone number and name of a destination at the time of telephone calling, "Calling," "Busy," and "No Answer."

Conventionally, these various types of message information to be displayed on character display unit 16 have been displayed in a specific mode under the control of the main apparatus (e.g., an electronic switcher) as described earlier. That is, conventionally, the main apparatus is responsible for the control of display (or display layout) of message information on character display unit 16.

Figure 3A:
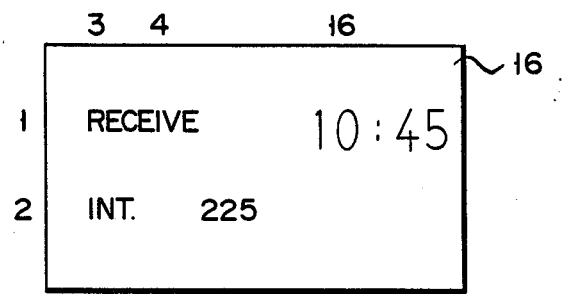
FIGS. 3A and 3B are diagrams showing examples of where to display message information on a display device.
Figure 3B:
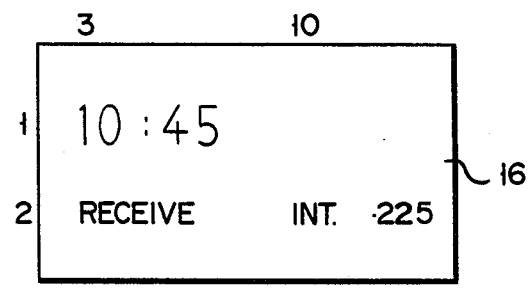

According to the present terminal apparatus, however, as shown in FIGS. 3A and 3B the display layout of message information can be set as desired by a user for each telephone terminal apparatus.

Setting the display layout of the message information may be performed by running a display layout setting program in CPU 5 upon selective operation of the display layout setting functions assigned to variable function keys 15. As illustrated in FIG. 3B, where to display the time is designated by "first row, third digit" and where to display message information is designated by "second row, third digit" while the location of a destination to be displayed is designated by "second row, tenth digit" using the numeral input function of dial pad 13. In this case, since the information about the destination is displayed from the tenth digit at the second row, the maximum characters allowed for the display of the message information from the "second row, third digit" is limited to seven characters (seven digits).

FIG. 3A illustrates an example in which the location of the time to be displayed is designated by "first row, sixteenth digit," the location of message information to be displayed is designated by "first row, third digit" and the location of a destination to be displayed is designated by "second row, fourth digit."

In this manner, by running the layout setting program, the information of the set layout is stored in memory 6 in correspondence with the attribute information that specifies the information to be displayed. Therefore, memory 6 stores different display layout information in accordance with the types of information to be displayed on character display unit 16. And in accordance with the display layout information set for each telephone terminal apparatus, various types of message information sent from the main apparatus are displayed on the designated display positions.

Figure 4A:
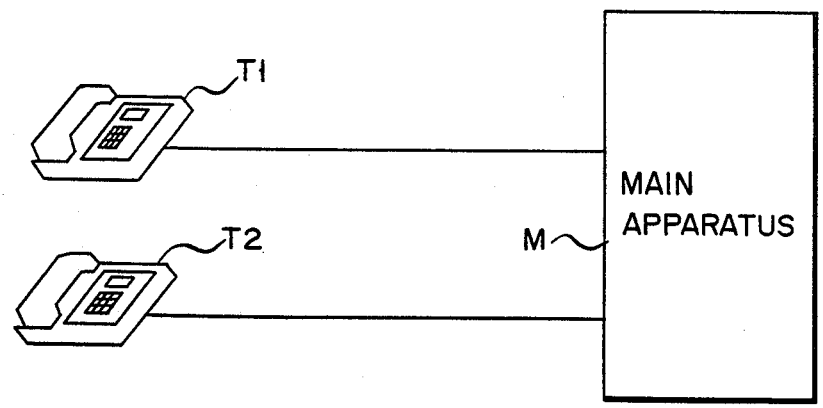
FIGS. 4A and 4B are diagrams respectively showing the arrangement of a telephone system and the format of message information sent from the main apparatus to the telephone terminal apparatuses of the system.
Figure 4B:
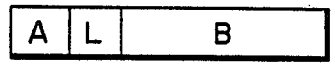
Figure 5:
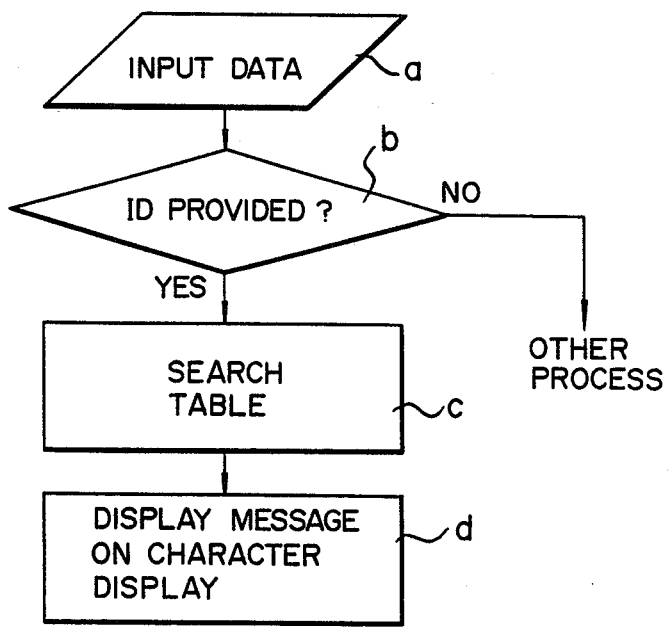
FIG. 5 is a flowchart illustrating a display control sequence for message information.

As should be clear from FIG. 4A, main apparatus M selectively sends to a plurality of telephone terminal apparatuses T1, T2, . . . message information that is constituted by an attribute identifier A, the maximum message length L and a message body B (see FIG. 4B) and requests the display of the message information sent. The individual telephone terminal apparatuses in turn causes CPU 5 to run the process sequence illustrated, for example, in FIG. 5 thereby to control the display of the message information sent from main apparatus M.

When data is sent to the individual telephone terminal apparatuses from main apparatus M (step a), the attribute identifier A affixed to the input data is discriminated first (step b). When the attribute identifier A specifies the display of message information, the display layout information stored in memory 6 is retrieved according to the identifier A (step c). This display layout retrieval is executed by determining the type of message information to be displayed from the attribute identifier A and then accessing memory 6 to attain the desired display layout information for the message information, which has been set as described above.

The message information sent from the main apparatus is displayed on character display unit 16 in the display layout read out from memory 6 under the control of CPU 5 (step d). As display layout information is stored in memory 6 for each telephone terminal apparatus, even if the same type of message information is sent to different telephone terminal apparatuses T1, T2, . . . from main apparatus M, the layout of the message information would differ between the individual telephone terminal apparatuses.

According to the present system, the layout of message information from the main apparatus that is to be displayed by the telephone terminal apparatuses can be freely set for each telephone terminal apparatus. Therefore, it is possible to effect message displays that could satisfy various demands from users of the telephone terminal apparatuses.

Furthermore, the main apparatus does not need to individually manage message display layouts for a plurality of telephone terminal apparatuses which are controlled by the main apparatus, but should simply give attribute information indicating the type of the message information to the telephone terminal apparatuses. This eliminates the conventional problem of causing an inevitable increase in programs in the main apparatus, and significantly reduces the work load of the main apparatus.

There is a further advantage that permits the telephone system to sufficiently cope with an increase in the quantity of telephone terminal apparatuses within the system.

This invention is not limited to the above-described, particular embodiment. For instance, basic display layouts of various message information may be set in advance and can be modified in accordance with the user demands. This prevents an inconvenience such that message information input prior to the setting of the display layout as desired by a user would be displayed in irresponsible layouts. In addition, character display unit 16 may be provided with a wider and longer display area and may be constituted by display elements other than an LCD. In short, this invention can be modified in various manners within the spirit and scope of the invention.

As has been explained above, according to the embodiment of this invention, display layout of message information can be set for each telephone terminal apparatus and the main apparatus should simply give the message information together with its attribute information to the telephone terminal apparatus. This therefore ensures that the message information can be properly displayed while fulfilling various user demands without increasing the number of programs in the main apparatus or the work load thereof. Since the display control of the message information can be effected for each telephone terminal apparatus, the operational efficiency of the main apparatus can be improved and an increase in the number of telephone terminal apparatuses in the telephone system can be properly coped with.

The following is an explanation of the essential portion of another embodiment of this invention where not only the message display control but also general controls of operation (auxiliary) information including tone output and lamp display controls are carried out. The arrangement of the telephone system and the telephone terminal apparatuses used therein in the second embodiment can be the same as those used in the first embodiment.

Figure 6:
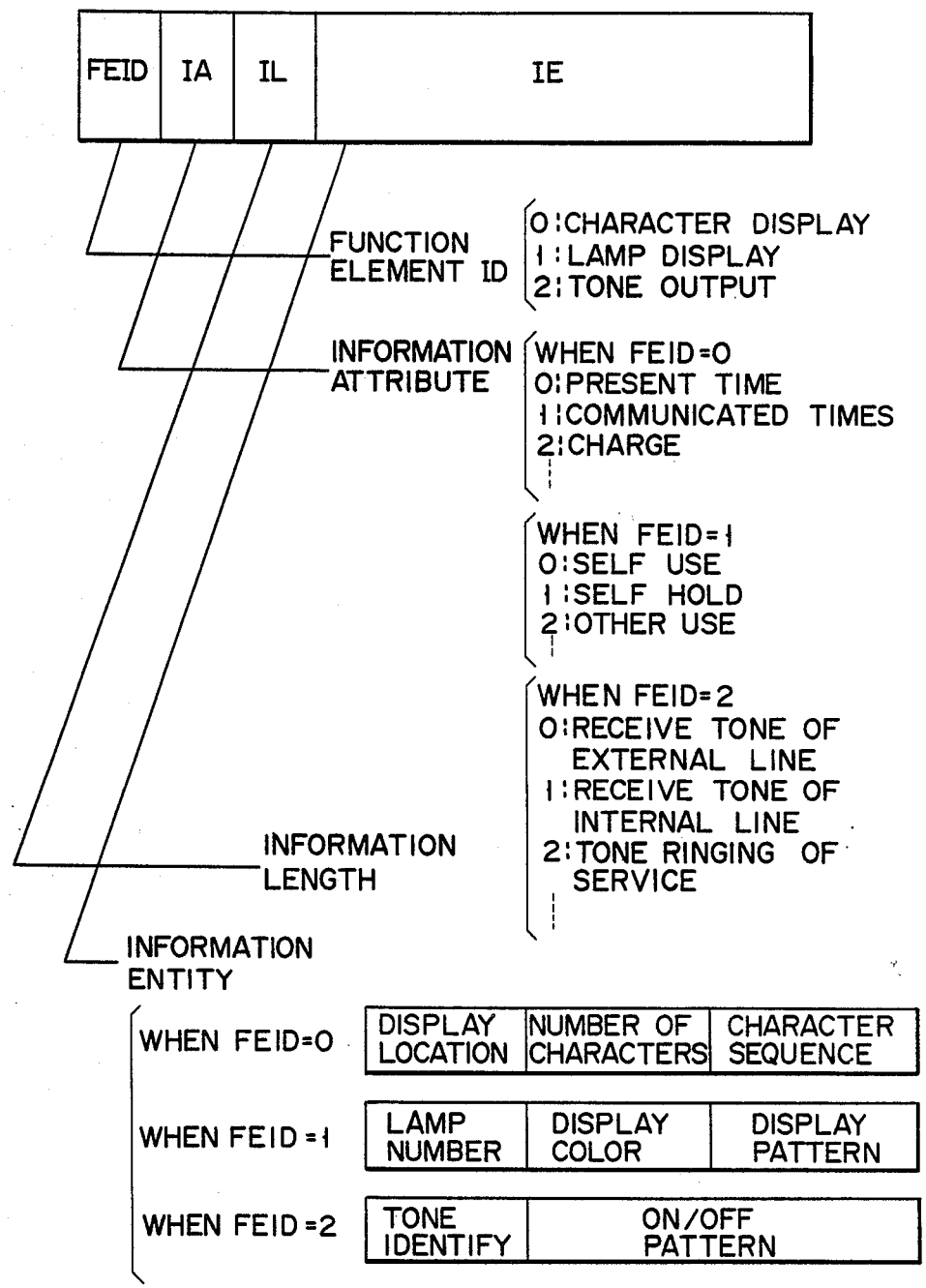
FIG. 6 is a diagram illustrating transmission data format for expanded control for explaining the essential section of another embodiment of this invention.

According to the second embodiment, a sequence of operation control data having the format shown in FIG. 6 is sent from main apparatus M to the individual telephone terminal apparatuses. The beginning section of the data is a function element ID (FEID) that has three codes, "0" for character display, "1" for lamp display and "2" for tone output. Following the FEID is information attribute IA that is assigned with codes corresponding to the attributes indicated in the Table given in a later section, in accordance with the FEID codes. Following the information attribute IA is an information length IL representing the length of information entity (IE), which follows the IL and is an area in which control data according to each FEID code is stored. When FEID=0, display location data, number-of-character data and character train data are sequentially designated, as illustrated in FIG. 6. When FEID=1, data is designated in the sequence of the lamp number, display color and display pattern, and when FEID=2, the data is designated in the sequence of the tone identifier and the ON/OFF pattern. The display pattern data and the ON/OFF pattern data may be treated as identifiers.

The individual telephone terminal apparatuses that receive such operation control data start the process sequence according to the type of the FEID as per the first embodiment, thereby executing processes for character display (by character display unit 16), lamp display (by lamp display unit 17) or tone output (by speaker 19) based on what has been registered in advance.

This registration is done for each telephone terminal apparatus by a user in the same manner as to set the message display layout. In this case, after the registration mode assigned to function keys 15 is set, one of the function elements, the character display, lamp display or tone output, is selected. Then, the desired information attribute is designated from the items shown in the Table below in correspondence with the function elements. In actually executing the registration, a menu corresponding to the table may be displayed on character display unit 16 so that the necessary registration process is done based on this menu. With respect to designation of the information attribute, the contents of individual edit items of each function element shown in the Table below have only to be modified.

TABLE

| Function Element | Edit Item | Information Attribute |
|---|---|---|
| Character Display | (1) Display ON/OFF | (1) Time |
|  | (2) Display Size | (2) Communication Time |
|  | (3) Display Location | (3) Telephone Call Fee |
|  | (4) Process When In Use With Other Display (Priority/ Temporary Hold/ Cancel) | (4) Caller Identifying Information (Number/Name) |
|  |  | (5) Destination Status |
|  |  | (6) Soft Key, etc. |
| Lamp Display | (1) Display Pattern | (1) Self Use |
|  | (2) Color | (2) Self Hold |
|  |  | (3) Other's Use |
|  |  | (4) Other's Hold, etc. |
| Tone Output | (1) Output ON/OFF | (1) Receive Tone Of External Line |
|  | (2) Pattern | (2) Receive Tone Of Internal Line |
|  | (3) Tone | (3) Receive Tone Of Service |
|  |  | (4) Tone Ringing Of Designation Number, etc. |

In the above table, items (1) through (4) in the information attribute corresponding to the tone output are used to permit a user to modify the response status based on (or due to) the received telephone content. Especially, the third one (3) of these four items may be used to inform that the received call is a recall due to a long time hold or a delayed response.

According to the above embodiment, when in addition to the message display control, the control of operation auxiliary information including the lamp display and tone output control is executed, it is possible to increase a freedom in controlling the operation information on the side of telephone terminal apparatus without increasing the amount of software in the main apparatus or the work load thereof.

What is claimed is:

1. A telephone system comprising:
    a main apparatus for generating at least an information entity to be recognized and an attribute identifier for representing a specific recognition of the information entity; and
    a telephone terminal apparatus, coupled to said main apparatus via a telephone line to cause a stimulus operation in which said main apparatus controls said telephone terminal apparatus, said telephone terminal apparatus having
    (a) means for determining the attribute identified;
    (b) means for storing previously registered data associated with the specific recognition of the information entity;
    (c) means for retrieving the previously registered data stored in said storing mans in accordance with the attribute identifier determined by said determining means;
    (d) means for implementing, when the previously registered data is retrieved, the information entity with the previously registered data, so that the telephone terminal apparatus executes the specific recognition of the information entity according to the previously registered data implemented by said implementing means even during the stimulus operation, and executes a default operation in response to the attribute identifier and the information entity from said main apparatus; and
    (e) means for outputting the information entity from said implementing means in accordance with said previously registered data.

2. A telephone system according to claim 1, wherein:
    said attribute identifier and said information entity, both generated in said main apparatus, are associated with a message.

3. A telephone system according to claim 2, wherein:
    said telephone terminal apparatus includes a character display for displaying said message as a message output.

4. A telephone system according to claim 2, wherein:
    said telephone terminal apparatus includes a lamp display device for displaying said message as a lamp output.

5. A telephone system according to claim 2, wherein:
    said telephone terminal apparatus includes a speaker for generating said message as a tone output.

6. A telephone terminal apparatus comprising:
    signal separator means, coupled to a telephone line, for separating a voice signal and a digital signal including at least an information entity to be recognized and an attribute identifier for representing a specific recognition of the information entity;
    transmitter/receiver means, coupled to said signal separator means, for performing transmission and reception of said voice signal;
    key input means for entering a key input;
    processing means, having means for executing the specific recognition of the information entity, coupled to said signal separator means and said key input means for processing previously registered data for said executing means, in accordance with the key input entered by said key input means, and decoding the attribute identifier and information entity included in the digital signal separated by said signal separator means, so that said executing means executes the specific recognition of the information entity in accordance with the previously registered data; and
    output means for outputting the information entity from said processing means in accordance with said previously registered data.

7. A telephone terminal apparatus according to claim 6, wherein:
    said attribute identifier and information entity are associated with a message.

8. A telephone terminal apparatus according to claim 7, wherein:
    said processing means causes a character display device to change a display layout of said message, in accordance with a key input from said key input means, corresponding to said attribute, identifier included in said digital signal.

9. A telephone terminal apparatus including at least a display means for displaying information and a key input means for entering a key input, said telephone terminal apparatus comprising:
    means for setting a position on said display means where message information is to be displayed, according to the key input entered by said key input means, and means for causing said message information to be displayed on the position of the display means set by said setting means when said message information is entered in said telephone terminal apparatus via a telephone line, said causing means retrieving from said setting means a position corresponding to an attribute identifier affixed to said message information, and said causing means detecting said attribute identifier, which is input together with said message information through said telephone line, thereby to control the position where said message information is to be displayed.

* * * * *